US008483283B2

(12) United States Patent
Tian et al.

(10) Patent No.: US 8,483,283 B2
(45) Date of Patent: Jul. 9, 2013

(54) REAL-TIME FACE DETECTION

(75) Inventors: Dihong Tian, San Jose, CA (US);
Joseph T. Friel, Ardmore, PA (US); J. William Mauchly, Berwyn, PA (US);
Wen-hsiung Chen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1002 days.

(21) Appl. No.: 12/021,198

(22) Filed: Jan. 28, 2008

(65) Prior Publication Data

US 2008/0240237 A1    Oct. 2, 2008

Related U.S. Application Data

(60) Provisional application No. 60/908,070, filed on Mar. 26, 2007.

(51) Int. Cl.
*H04N 7/12* (2006.01)

(52) U.S. Cl.
USPC ............. 375/240.24; 375/240.05; 375/240.18

(58) Field of Classification Search
USPC ........................................ 375/240.01–240.29
See application file for complete search history.

(56) References Cited

U.S. PATENT DOCUMENTS

| | | | |
|---|---|---|---|
| 5,715,377 A | 2/1998 | Fukushima et al. | |
| 5,940,530 A | 8/1999 | Fukushima et al. | |
| 6,148,092 A | 11/2000 | Qian | 382/118 |
| 6,173,069 B1 | 1/2001 | Daly et al. | |
| 6,356,589 B1 * | 3/2002 | Gebler et al. | 375/240.1 |
| 6,430,222 B1 * | 8/2002 | Okada | 375/240.03 |
| 6,798,834 B1 * | 9/2004 | Murakami et al. | 375/240.12 |
| 7,046,862 B2 * | 5/2006 | Ishizaka et al. | 382/298 |
| 7,269,292 B2 | 9/2007 | Steinberg | |
| 8,086,076 B2 * | 12/2011 | Tian et al. | 382/304 |
| 8,315,466 B2 * | 11/2012 | El-Maleh et al. | 382/232 |
| 8,363,719 B2 * | 1/2013 | Nakayama | 375/240.03 |
| 2008/0044064 A1 * | 2/2008 | His | 382/118 |
| 2009/0207233 A1 * | 8/2009 | Mauchly et al. | 348/14.09 |

OTHER PUBLICATIONS

Farrukh, A.; Ahmad, A.; Khan, M.I.; Khan, N., Automated segmentation of skin-tone regions in video sequences, Proceedings IEEE Students Conference, ISCON_apos_02., vol. 1, Issue , Aug. 16-17, 2002 pp. 122-128.
Y. Avrithis, N. Tsapatsoulis and S. Kollias, "Color-Based Retrieval of Facial Images," European Signal Processing Conference (EUSIPCO'00), Tampere, Finland, Sep. 2000.

(Continued)

*Primary Examiner* — Michael Thier
*Assistant Examiner* — Feben M Haile
(74) *Attorney, Agent, or Firm* — Dov Rosenfeld; Inventek

(57) ABSTRACT

An apparatus, a method, and a computer-readable medium having instructions encoded thereon that when executed cause a method to be carried out. The method includes dividing at least a portion of a picture of a video stream into parts of blocks, and processing the parts in parallel by a plurality of interconnected processors. The processing of a respective part by its respective processor includes edge detection and color segmentation to determine block-level edge features including block-level color-segmented edge features. Each processor also performs coding functions on its respective part of the picture. The method also includes block-level processing using the block-level edge features to determine which blocks in the picture are likely to be that of a face, the block-level processing being at the granularity of at least a block.

21 Claims, 10 Drawing Sheets

OTHER PUBLICATIONS

N.Tsapatsoulis, Y. Avrithis and S. Kollias, "Face Detection for Multimedia Applications" Proceedings of the ICIP'00, Vancouver, BC, Canada, Sep. 2000.

Hualu Wang and Shih-Fu Chang: "A highly efficient system for automatic face region detection inMPEG video," IEEE Transactions on Circuits and Systems for Video Technology, vol. 7, Issue: 4, Aug. 1997, pp. 615-628.

Tsapatsoulis, N. Kollias, S.: "Face detection in color images and video sequences," 10th Mediterranean Electrotechnical Conference, 2000, MELECON 2000. vol. 2, pp. 498-502, 2000.

Ming-Hsuan Yang, David J. Kriegman, and Narendra Ahuja, "Detecting Faces in Images: A Survey," IEEE Transactions on Pattern Analysis and Machine Intelligence, vol. 24, No. 1, Jan. 2002, pp. 34-58.

Jie Yang; Waibel, A.: "A real-time face tracker," Proceedings 3rd IEEE Workshop on Applications of Computer Vision, 1996. WACV 96, Dec. 2-4, 1996 pp. 142-147.

Soohyun Kim, Sunghyun Lim, Hyungtai Cha, and Hernsoo Hahn, "Block-based face detection scheme using face color and motion information," Real Time Imaging VIII, San Jose, CA. vol. 5297, No. 1, Jan. 2004, pp. 78-88.

Nariman Habili, Cheng Chew Lim, and Alireza Moini, "Segmentation of the Face and Hands in Sign Language Video Sequences Using Color and Motion Cues," IEEE Transactions on Circuits and Systems for Video Technology, Piscataway, NJ. vol. 14, No. 8, Aug. 2004, pp. 1086-1097.

Darren Butler, Chris McCool, Matthew McKay, Scott Lowther, Vinod Chandran, and Sridha Sridharan, "Robust Face Localisation Using Motion, Colour & Fusion," Proc. VIIth Digital Image Computing: Techniques and Applications, Sydney, Australia. Dec. 2003, pp. 899-908.

Scott Daly, Kristine Matthews, and Jordi Ribas-Corbera, "Face-Based Visually-Optimized Image Sequence Coding," International Conference on Image Processing, Chicago, IL. vol. 3, Oct. 1998, pp. 443-447.

W.J. Welsh, S. Searby, and J.B. Waite, "Model-based Image Coding," British Telecom Technology Journal, London, Great Britain. vol. 8, No. 3, Jul. 1990, pp. 94-106.

PCT International Search Report on PCT Application PCT/US2008/058079.

PCT International Preliminary Report on Patentability on PCT Application PCT/US2008/058079.

First office action on EPO application No. 08732786.2 mailed Jul. 17, 2012.

\* cited by examiner

| +1 | 0 | -1 |
|----|---|----|
| +2 | 0 | -2 |
| +1 | 0 | -1 |

Hx

| +1 | +2 | +1 |
|----|----|----|
| 0  | 0  | 0  |
| -1 | -2 | -1 |

Hy

# REAL-TIME FACE DETECTION

RELATED APPLICATION

The present invention claims priority of and is a conversion of U.S. Provisional Patent Application No. 60/908,070 to inventors Tian et al., filed Mar. 26, 2007 and titled Real-Time Face Detection. The contents of such U.S. Application 60/908,070 are incorporated herein by reference.

FIELD OF THE INVENTION

The present disclosure relates generally to processing of video data.

BACKGROUND

High-definition (HD) resolution video content has become the trend for emerging streaming video systems. In regard to the large computation demand, distributed video coding architecture is considered as a cost-effective solution for coding, i.e., compressing live, HD video with low processing latency. See for example, U.S. patent application Ser. No. 11/539,514 to inventors Mauchly et al., titled VIDEO ENCODER WITH MULTIPLE PROCESSORS, that describes a coding apparatus that uses multiple coders which operate in different rows of the same slice of the same video frame. Data dependencies between frames, rows, and blocks are resolved through the use of a data network. Block information is passed between coders of adjacent rows. The apparatus can achieve low latency compared to other parallel approaches.

In many streaming video systems such as a video conferencing system, real-time detection of human faces in the video sequence is desired to improve the application quality. With detected face regions, for example, the video coder can assign smaller, that is, finer quantization step sizes to frame blocks that are within a face region while higher, i.e., coarser quantization step sizes are assigned to the remaining portion of the frame, which is expected to provide higher visual quality of the scene under the same bit rate.

Methods for face detection are known that require knowledge of the entire picture at the time of processing. In a distributed coding architecture wherein different parts of a picture may be processed simultaneously in different distributed elements, the entire picture may no longer be available.

DESCRIPTION OF EXAMPLE EMBODIMENTS

Overview

Figure 1:
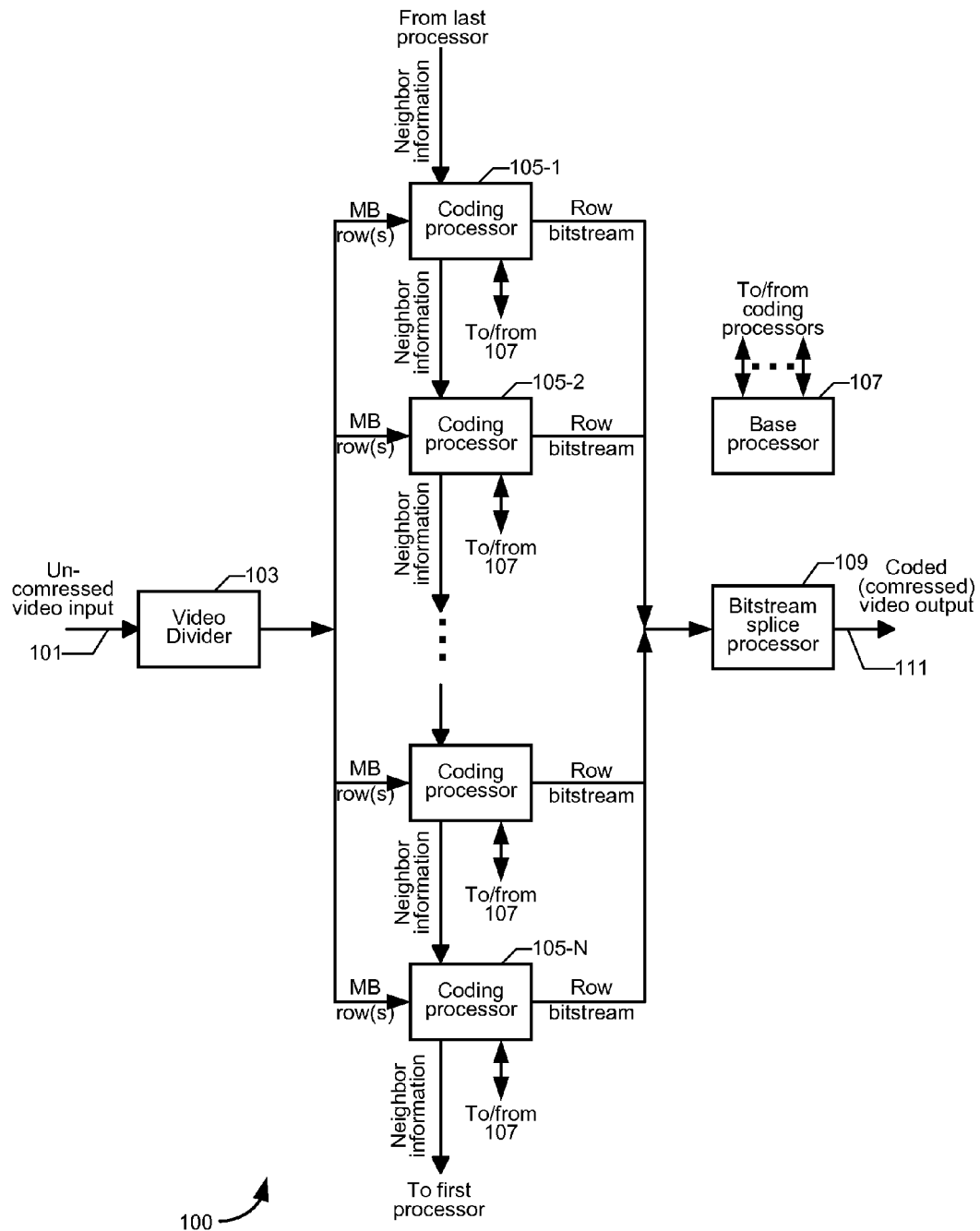
FIG. 1 shows a simplified block diagram of an apparatus that includes multiple coding processors and that includes an embodiment of the invention.

Embodiments of the present invention include a method, and apparatus, and logic encoded in one or more computer-readable tangible medium to carry out a method. The method is to perform real-time face detection on video, e.g., high definition (HD) resolution, high frame-rate video. One example application is an image coder that uses a distributed coding architecture with a plurality of coding processors operating simultaneously. One application is in a video teleconferencing system. The method uses block-level edge features in combination with color information to perform face detection. To provide a real-time solution, one embodiment of the method includes distributing computationally demanding tasks to the plurality of processors, while leaving a minimum computation load to the remaining steps that require centralized processing or information from the plurality of processors.

One particular embodiment includes a method comprising dividing at least a portion of a picture of a video stream into parts of blocks, and processing the parts in parallel by a plurality of interconnected processors. The processing of a respective part by its respective processor includes edge detection and color segmentation to determine block-level edge features including block-level color-segmented edge features. Each processor also performs coding functions on its respective part of the picture. The method also includes block-level processing using the block-level edge features to determine which blocks in the picture are likely to be that of a face, the block-level processing being at the granularity of at least a block.

The processing by each processor includes edge detection and color segmentation to determine block-level edge features that include block-level color-segmented edge features. Each processor also performs coding functions on its respective part of the picture. The method also includes block-level processing using the block-level edge features to determine which blocks in the picture are likely to be that of a face, the block-level processing being at the granularity of at least a block. The coding by the plurality processors of the respective parts of the picture is carried out in parallel by the respective processors.

In one embodiment, the coding by each of the processors includes quantization, and wherein the processors use the results of the determining of which blocks in the picture are likely to be that of a face to more finely quantize blocks that are likely to be that of a face than blocks that are less likely to be that of a face.

One particular embodiment includes an apparatus comprising a video divider operative to accept at least a portion of a picture of a video stream and to divide the at least portion of the picture into parts, each part including a plurality of blocks of the picture. The apparatus also comprises a plurality of interconnected processors, each coupled to the video divider and each including a coding processor operative to perform coding functions for coding a respective part of the picture, such that the plurality of processors can operate in parallel to simultaneously perform coding functions on a plurality of parts, wherein the processor also are operative to determine in parallel, for at least some of the blocks in each processor's respective part, block-level edge features including block-level color-segmented edge features. The apparatus further comprises block-level processing logic operative to receive the block-level edge features from the processors and to carry out processing to determine which blocks in the picture are likely to be that of a face, the processing by the block-level processing logic being at the granularity of at least a block.

In one embodiment, the apparatus is configured to code the video stream and to determine which blocks in each picture of the video stream are likely to be that of a face at the video rate of the video stream.

One particular embodiment includes a computer-readable and tangible medium encoded with instructions that when executed by one or more processors carry out method. The method includes dividing at least a portion of a picture of a video stream into parts of blocks, and processing the parts in parallel by a plurality of interconnected processors. The processing of a respective part by its respective coding processor includes edge detection and color segmentation to determine block-level edge features that include block-level color-segmented edge features. Each coding processor also performs coding functions on its respective part of the picture. The method also includes block-level processing using the block-level edge features to determine which blocks in the picture are likely to be that of a face, the block-level processing being at the granularity of at least a block.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

EXAMPLE EMBODIMENTS

FIG. 1 shows one embodiment of a parallel coding apparatus 100 that includes an embodiment of the present invention. The apparatus 100 includes a plurality of processors, each including a coding processor, such that a set of coding processors 105-1, 105-2, . . . , 105-N is included, wherein N is the number of coding processors. In one embodiment, each processor includes a memory encoded with instructions that when executed, cause the coding processor to carry out a set of process steps. In one embodiment, each processor is a core in a multi-core processing apparatus. The memory for each processor in one embodiment is dedicated, and in another embodiment, is part of a memory available to all processors, e.g., via a bus structure. The interconnections between the various processors of apparatus 100 are in one embodiment direct connections, in another embodiment, connections via a bus structure, and in yet another embodiment, fast network connections.

The input 101 to the apparatus 100 is an uncompressed video stream. In one embodiment, the video stream is an HD video stream. HD is defined herein as having at least 700 lines of video per frame. The apparatus 100 is operable to code the input 101 into a compressed bitstream 111. In one embodiment of the invention, the input 101 to the video coder includes HD resolution video captured in a video conferencing terminal which is part of a video conferencing system. Each of processors 105-$i$, i=1, . . . , N is operative to perform coding functions for coding parts of a picture. A video divider 103 is operative to accept a frame, i.e., a picture of a video stream and to divide at least a portion of the frame into smaller parts, each part including a plurality of blocks of the frame. The size of the portion depends on how many processors there are, and how large a part each processor is operative to process. In this example, each part is a set of rows of macroblocks in the input picture. The portion is the top half of the picture. In one example, each macroblock (MB) includes 16 by 16 pixels of picture data. The coding in one embodiment of the invention is compatible with the ITU-T H.264 coding standard, also called MPEG-4 part 10 and Advanced Video Coder (AVC). The macroblocks may possibly be split further into smaller blocks for different parts of the coding, each set to be coded by one of a plurality of coders operating in parallel. Other embodiments of the invention use different block sizes.

The apparatus is configured to operate in real time, i.e., at the rate of the video stream, called the video rate.

Each coding processor is operative to carry out coding functions on a plurality of blocks of a picture, e.g., the macroblocks of one or more rows of a picture. The coding functions for each macroblock are tasks common to the macroblocks, and include, for one or more blocks in the macroblock, determining motion compensated residual images, transforming image data of the residual images, ordering the transform coefficients to an ordered series of the transform coefficients, quantizing the transform coefficients of the ordered series, and entropy coding the ordered series of quantized transform coefficients. The coding processors are operative in parallel to simultaneously carry out the coding functions on a plurality of parts of a picture.

The video divider 103 is operative to divide the at least portion of the input picture such that each coding processor 105-$i$, i=1, . . . , N processes and carries out coding functions on a set of one or more rows of macroblocks of the picture. Such a row of macroblocks is called a macroblock row (MB row) herein. In one embodiment, each processor processes a single MB row. One embodiment of apparatus 100 includes 40 coding processors. Note that the number of MB rows is 45 for 720 line frames, e.g., 720 p and 67 for (approximately) 1080 line frames.

In one embodiment, the video divider also includes pre-processing that includes any required color conversion.

One embodiment of the face detection method of the present invention uses block-level edge features determined for each block. Such edge features in one version include color-segmented edge features obtained by color segmentation. One embodiment is applicable to video pictures with 1920×1080 pixel frames, with YCbCr color components.

Each of the processors is operative to determine in parallel, for at least some of the blocks in the respective part, block-level edge features including block-level color-segmented edge features. Apparatus 100 includes block-level processing logic, e.g., a separate block-level processor 107, or in another embodiment, processing logic operations carried out by one or more of the processors 105-1, . . . , 105-N. The block-level processing logic is operative to receive the block-level edge features from the processors and to carry out processing to determine which blocks in the picture are likely to be that of a face. In one embodiment, the processing by the block-level processing logic being at the granularity of at least a block.

In one embodiment, the block-level processing logic is operative to output the number of detected heads, and a binary macroblock map that marks which blocks are likely to be that of a face, e.g., which macroblocks are within a head region. One version further is operative to determine the positions of eyes and mouth in each head region if eye(s) and/or a mouth is/are detected, and to generate an indication of which blocks that include eyes and/or mouth if at least one eye and/or a mouth is/are detected. The results of face detection information are used in the coding of the macroblocks by the processors 105-1, . . . , 105-N. In one embodiment in which block-based transform compression coding is used, those macroblocks that are within a face region are coded with finer quantization of transform coefficients of the picture data of the macroblocks.

The coding by each of the coding processors includes quantization. In one embodiment, the plurality of processors 105-1, . . . , 105-N are operative to use the results of the determining of which blocks in the picture are likely to be that of a face to more finely quantize blocks that are likely to be that of a face than blocks that are less likely to be that of a face.

Figure 2:
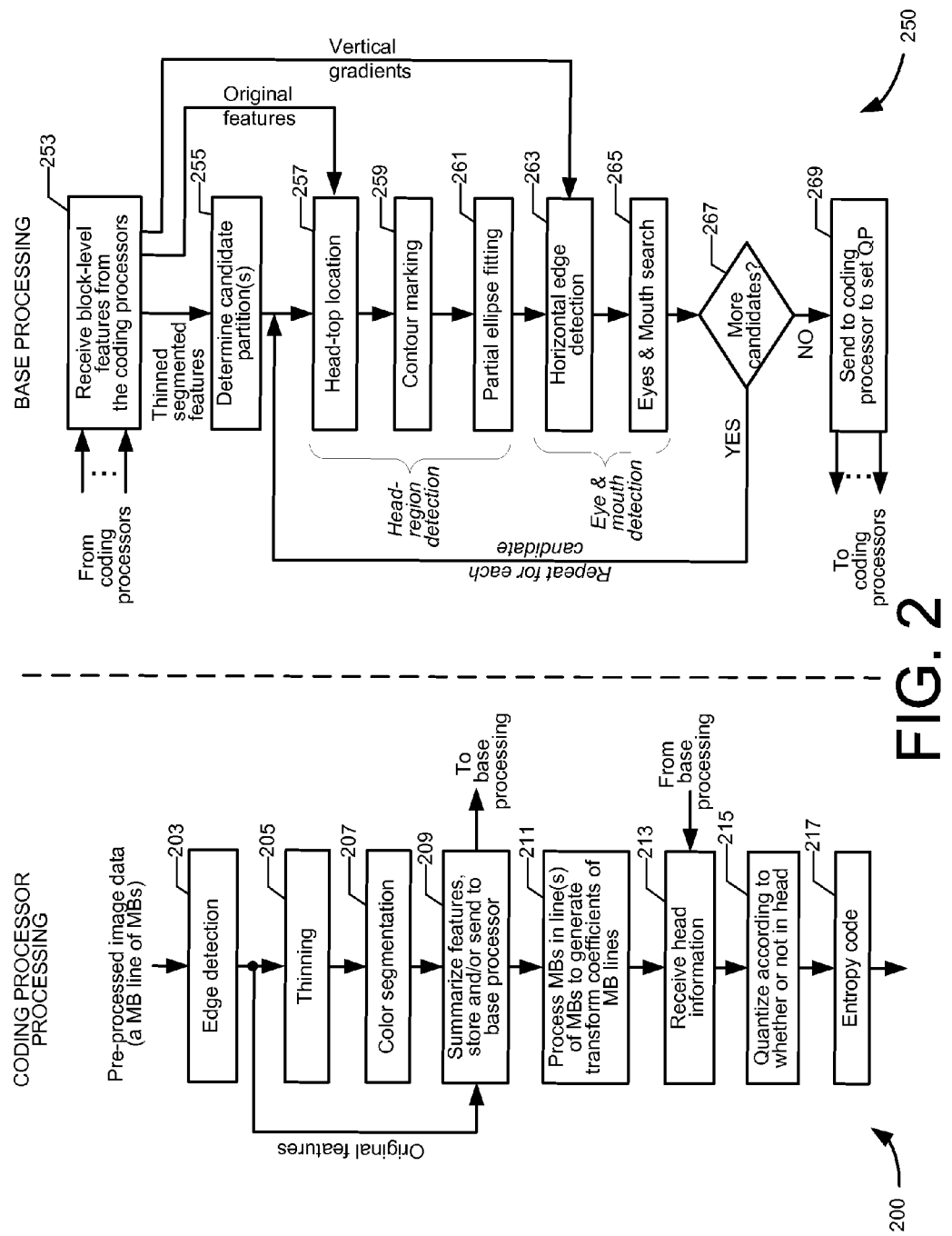
FIG. 2 shows in simplified flowchart form a method that includes an embodiment of the invention.

FIG. 2 shows flowcharts of a method embodiment, including a flowchart of the processing 200 that occurs in each of the coding processors 105-1, . . . , 105-N, and a flowchart 250 of the block-level processing, which in one embodiment occurs in a separate block-level processor 107, and in another embodiment, occurs in each coding processor 105-1, . . . , 105-N. While much of the processing 200 that occurs in the coding processors is carried out on the pixels of macroblocks, in one embodiment, the block-level processing 250 is carried out at the granularity of macroblocks, and so is relatively fast.

The method is arranged so that it can be performed at video rate by an apparatus such as shown in FIG. 1.

One embodiment includes pre-processing, e.g., for color space conversion and selecting which macroblock lines are to be subject to face detection.

Starting with the processing for the coding processors, in one embodiment, for each 16×16 macroblock (MB), each coding processor is operable to perform at least the following tasks before coding the macroblock using a compression method: edge detection 203; edge thinning 205; color segmentation 207; and feature summarization 209.

At the end of these pre-coding processes, the processor provides, e.g., sends as part of the feature summarization 209 a set of results for each MB to a block-level processing process 250, e.g., to a block-level processor 207 programmed to perform the block-level processing 250. In one embodiment, the set of results includes: 1) a block level edge-feature in the form of an indication of the number of original edge features in the MB and 2) a block level color-segmented edge-feature in the form of an indication of the number of thinned, color-segmented edge features in the MB.

In one embodiment, the block-level processing process 250, e.g., carried out by the block-level processor 107 collects/receives in 253 the results, e.g., block-level features for all the MBs from all the coding processors and performs processing steps to detect face regions. The face region detection is carried out rapidly. For example, the method steps of the processing 250 are carried out at the granularity of macroblocks rather than at the pixel level. In the embodiment that includes a separate block-level processor 107, this process 250 occurs while the processors proceed with such video coding tasks 211 as motion estimation, motion compensation, and block transform to generate for each MB of a MB line a set of transform coefficients.

The block-level processing includes using block-level color-segmented edge features, e.g., the thinned color-segmented features to detect in 255 a candidate region called a candidate "partition." The block level processing further includes repeating for each detected candidate partition: step 257 of locating a pre-defined part, e.g., location of the top of a head, step 259 of determining one or more boundary points that define a contour, called "marking a contour," and step 261 of fitting a pre-defined shape, e.g., an elliptical shape such as a half-ellipse, in order to carry out head region detection. In one embodiment, the contour is defined by the top, left, and right boundaries of a likely head region, e.g., by a half bounding-box for the head region. In some embodiments, steps 263 of horizontal edge detection and 265 of face feature, e.g., eyes and mouth searching are included to carry out eye and mouth detection within a detected head region. These sets of steps are repeated for each candidate partition until (see 267) there are no more candidate partitions.

In 269, the block-level processing process provides the coding processors with an indication about which regions in the picture, in particular, which MBs are in face regions. The results are in the form of a macroblock map indicating which macroblocks are within a head region, and, in one version that includes eyes and mouth detection (263, 265), the positions of eyes and mouth in each head region if one or more eyes and/or a mouth are detected. These results are formed and sent in 269 to each of the coding processors 105-1, . . . , 105-N.

Returning to the processing 200 at the coding processors, in 213, the detected head information is received from the block-level processing, and 215 includes quantizing the transform coefficients using the feedback from the block-level processing according to a pre-defined scheme to assign such coding parameters as quantization step size to MBs according to whether they are or not in a face region, e.g., in an eye or mouth region. The processing proceeds in 217 with ordering the quantized transform coefficients and entropy coding the ordered sequence of quantized transform coefficients to form the bits of the coded bitstream.

The coding produces an coded bitstream for the video stream

Note that in one embodiment, because different macroblocks are coded using different quantization, one embodiment includes incorporating information in the coded bitstream to enable a decoder to know the quantization used in the bitstream.

Returning to the architecture shown in FIG. 1, the coded bitstreams from all the coding processors 105-1, . . . , 105-N are input to a bitstream splice processor 109 to generate the compressed bitstream 111 as the output.

Note that while in one embodiment, the block-level processing occurs in a separate block-level processor 107, in an alternate embodiment still covered by the flowcharts of FIG. 2, a separate block-level processor is not used. In such an alternate embodiment, each coding processor in 209 sends every other coding processor the results of the edge feature extraction of 201, 203, 205, and 207. The block-level processing 250 is carried out once by each coding processor. At the end, each coding processor knows which macroblocks are in a detected head region. One embodiment of the block-level processing 250 is carried out at macroblock granularity rather than at the pixel level, and so can be completed relatively fast.

Figures 3, 4:
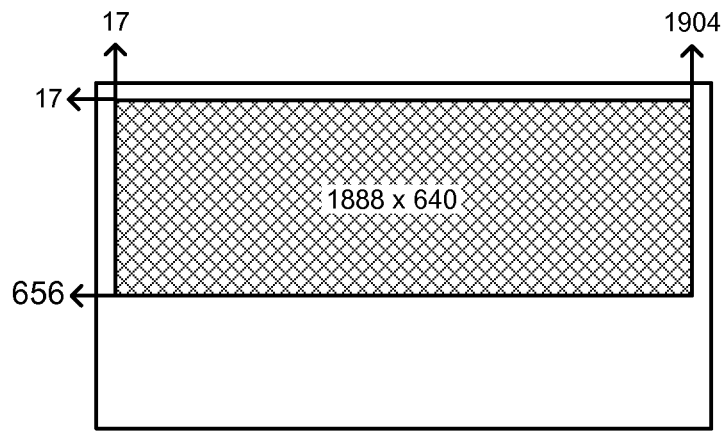
FIG. 3 shows frame clipping of a high-definition resolution input frame to select a part of the input frame subject to face detection according to an embodiment of the invention.
FIG. 4 shows Sobel edge detection convolution kernels used in one embodiment of the invention.

In one embodiment in which there are 40 coding processors, i.e., N=40, only a part of each frame wherein a face is likely to occur, e.g., a top part, e.g., the upper half of each frame is subject to the face detection and adaptive quantization of face regions. Such an embodiment is based on an assumption that heads are most likely to be in the upper half of a frame. In such an embodiment, a pre-processing step carries out any color space converting and further clips the input picture to be no more than 1888×640 pixels by removing 16 boundary lines from the top, the left-hand side and the right-hand side, and the lower 424 lines, as shown in FIG. 3. FIG. 3 shows frame clipping of a high-definition resolution input frame to select an 1888×640 pixel part of the input frame subject to face detection according to an embodiment of the invention. The 640 lines form the 40 MB lines for processing by the coding processors 105-1, . . . , 105-40.

The different tasks performed at each coding processor and by the block-level processor are now described in more detail.

Edge Detection

One embodiment of edge detection 203 includes performing convolution on the luminance component of each MB using convolution kernels. In one embodiment, the Sobel convolution kernels are used. FIG. 4 shows the Sobel horizontal and vertical 3×3 edge convolution kernels denoted Hx and Hy, respectively, to produce horizontal and vertical gradients denoted Gx and Gy, respectively. Many edge detection methods are known other than convolution by the simple Sobel kernels shown in FIG. 4, and different embodiments use such other edge detectors.

Continuing with one embodiment, a threshold is applied to the convolution result in 203 as follows to obtain what are called the "original" edge-detection features:

$$Gx^2+Gy^2 \geq cutoff,$$

where in one embodiment cutoff is a pre-selected threshold and in another embodiment cutoff=4 m with m denoting the mean value of the squared gradient magnitude.

In 205, the original edge features are processed by a "thinning" operation to suppress local maxima. In one embodiment, the thinning 205 includes selecting among the original edge features only those that have the largest gradient magnitude compared to their horizontal neighbors, when the horizontal gradient has a larger magnitude than that of the vertical gradient, or vertical neighbors, when the vertical gradient has a larger magnitude than that of the horizontal gradient.

Both the original and the thinned edge results are stored. In one embodiment that includes eyes and mouth detection, the vertical gradients of the picture also are stored. The original edge features will be used for head-contour marking and half-ellipse fitting (the inventors have found the original features have fewer breaks on the edge). On the other hand, the inventors have found that the thinned edge results appear to remove noise and preserve those edges that have significant luminance variation. Combined with color segmentation, the thinned features are used to determine the horizontal center of the potential head region. Finally, the vertical gradients are used for eyes and mouth detection in those embodiments that include such eyes and mouth detection.

Color Segmentation

Skin-tone segmentation has been researched extensively in the academic literature on face detection. See for example, Ming-Hsuan Yang, David J. Kriegman, and Narendra Ahuja, "Detecting Faces in Images: A Survey," IEEE Transactions on Pattern Analysis and Machine Intelligence, Vol. 24, No. 1, January 2002, pages 34-58. Such research has verified that regardless of the race of the human subject, the chrominance values of skin fall into certain ranges.

In one embodiment, skin-tone segmentation includes selecting only regions within the range:

$$R_{Cb}=[77,127], \text{ and } R_{Cr}=[133,173].$$

The inventors have found that skin tone by itself, however, is insufficient to segment the face from the background. A color map generated based on the color ranges might include background. Moreover, the color components, e.g., Cb and Cr, are not independent from the luminance and therefore might vary depending on the lighting condition.

Figure 5A:
FIG. 5A shows thinned edges of an example picture—a frame of a video stream—prior to color segmentation.
Figure 5B:
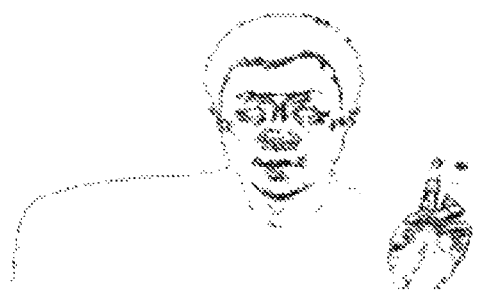
FIG. 5B shows the thinned edges after color segmentation, according to an embodiment of the invention.

One embodiment of the method includes in 207 skin-color segmentation using the picture data on the thinned edge results of the thinning 205. FIG. 5A shows the thinned edge features of a picture. FIG. 5B shows the use of a color map filter on the thinned edge result. By color segmentation, as can be seen in the example, noisy small edges caused by chairs, shirts, etc. are removed. The remaining result has most of its edge features in the face regions.

Feature Summarization

For each MB, in 209, the edge features are summarized for the original and thinned results, respectively, and the summarized information is passed to the block-level processing process 250, e.g., to the block-level processor 107. In one embodiment, the final result is packed into 16 bits: 8 bits for the total number of original edge features and 8 bits for the total number of thinned, color-segmented edge features. In an alternate embodiment that includes eye and mouth detection, further information is sent about vertical gradients.

After the edge features are summarized and sent to the block-level processing 250, the further face detection steps are performed by the block-level processing at a macroblock scale rather than pixel by pixel, resulting in a very low computation load. At the same time, the coding processing 200 continues until the face detection results are used, e.g., for quantization.

Candidate Partition

Turning now to the block-level processing 250, 255 includes partitioning the input picture to determine candidate partitions using the post-color segmentation thinned edge features. One embodiment includes in 255 a vertical line integration projection process in which each vertical line is projected onto the horizontal axis—the x-axis by integrating, e.g., summing the values at any x-value. In one embodiment, step 255 further includes partitioning the picture into person candidates by locating peaks on the results of the projection, and determining the respective widths of the peaks. Thresholding is used to reject small peaks and/or narrow widths.

Figure 6A:
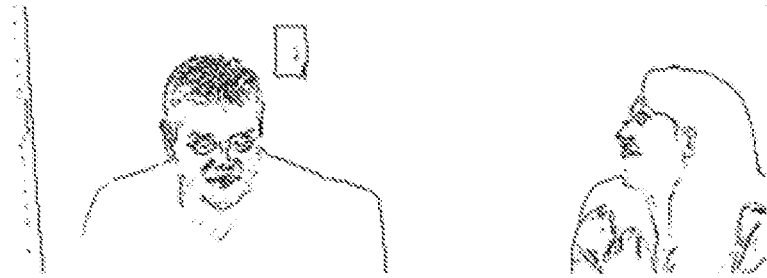
FIG. 6A shows the color-segmented thinned edges of an input picture.
Figure 6B:
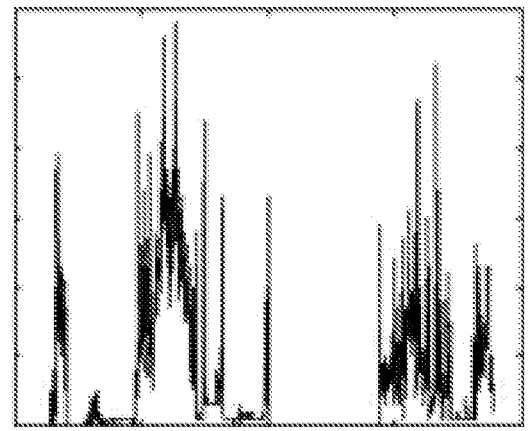
FIG. 6B shows the results of projecting the thinned edges of the sample picture of FIG. 6A onto the horizontal axis.
Figure 6C:
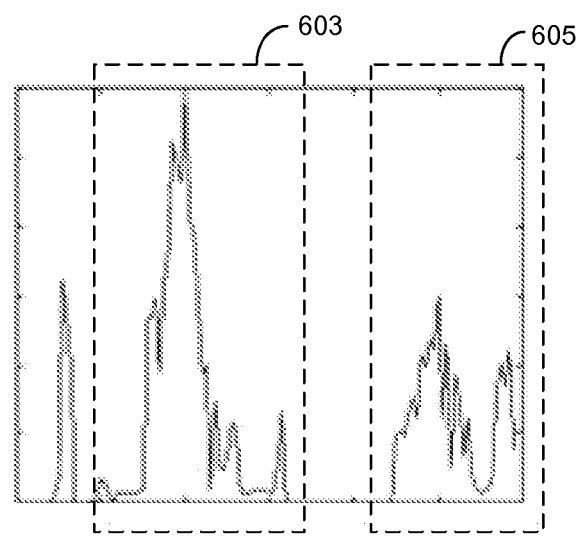
FIG. 6C shows the results of thresholding the projections shown in FIG. 6B to reject too thin and too narrow peaks, and shows two determined face candidate regions.

FIG. 6A shows an example input picture of color-segmented thinned edge features. FIG. 6B shows the results of projecting this picture onto the horizontal axis. FIG. 6C shows the results of thresholding the projections shown in FIG. 6B to reject too thin and too narrow peaks. Two person candidates, 603 and 605 are found.

The following steps 257, 259, and 261 are performed for each partitioned candidate. In an embodiment that includes eyes and mouth detection, steps 263 and 265 also are performed for each partitioned candidate.

Locating the Head-Top

For each candidate partition, the method includes in 257 locating what is likely to be the top of the head of a face. One embodiment includes locating the horizontal center of the partitioned vertical line integration projection curve. In order to add to the reliability of the results, one embodiment includes computing the horizontal center several times with different projection horizons, and averaging the computed horizontal centers. One embodiment further includes using the original edge result to locate the head top by finding the upper most edge feature on the set of MBs at the computed horizontal center. In an alternate embodiment, starting from the MB so determined, a neighborhood search is performed until a spatially local maximum is reached. The search is performed to both the left and to the right. A "to-the-left" search and a "to-the-right" search check the next to the left and next to the right columns, respectively, and each ascertains if the upper-most MB (with original edge features) on that MB column is above the present highest. If so, the process continues, otherwise it stops. At the end of this process, there will be two MB positions, obtained from the "to-the-left" and the "to-the-right" searches, respectively. The method selects the higher (upper) one of these as the head top.

One embodiment further includes, in order to obtain a more reliable result, applying image processing operations original edge features, including "opening" and "closing" of gaps operations may be applied to the prior to the locating of the head-top to remove undesired edge features, called noise. How to incorporate such image processing would be clear to those in the art.

Contour Marking

Figure 7:
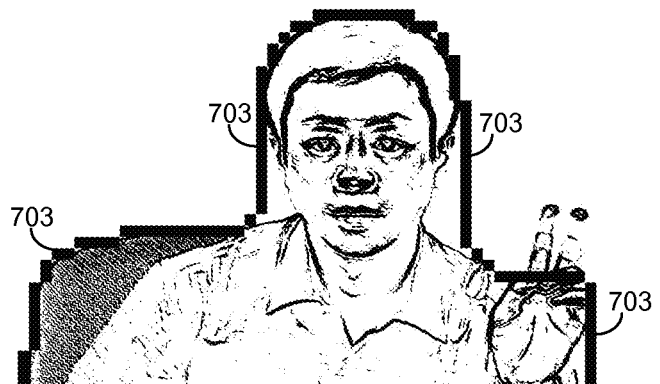
FIG. 7 shows the results of one embodiment of a contour marking operation on an example picture.

Starting from the located head top and using the original edge result, the method includes in 259 marking a contour in the partition, including searching downward to the left and right of the located head top until the left-most and right-most horizontal positions, and marking for each horizontal position the upper-most MB with edge features in order to form a contour of the head and the shoulders. FIG. 7 shows the results as contour 703 of one embodiment of such a contour marking operation 259 on an example picture. Note that because the search is downwards, the fingers on the right are not included as part of the contour 703.

Half-Ellipse Fitting

One embodiment includes in 261 fitting a half-ellipse to the head contour from the contour marking in order to select the head region. Possible ellipses are fitted and one is selected from the possible ellipses that are similar to the found contour according to a similarity measure. Starting from the head top, in one embodiment, the possible origins of the ellipses are the mid-points of the horizontal line segments connecting the contour. One embodiment includes assuming that the major axis of the ellipse is vertical. The ellipse fitting 261 includes locating a point that has equal distance to the head top and to the horizontal boundary of the contour. The located point defines the first ellipse to be evaluated, which has equal-length semimajor and semiminor axes. Starting from there, the method includes searching downward and finding the origin that provides the best similarity between the contour segment and the corresponding half-ellipse. For each tested origin, $MB_0$, the half-ellipse fitting error is in one embodiment evaluated by:

$$E(MB_0) = \frac{1}{N_M} \sum_{MB_i} \left| \frac{[Y(MB_i) - Y(MB_0)]^2}{R_b(MB_0)^2} + \frac{[X(MB_i) - X(MB_0)]^2}{R_a(MB_0)^2} - 1 \right|$$

where $N_M$ is the total number of MBs evaluated, $MB_i$, i=1, ..., NM denotes the i'th MB on the contour segment, and $R_b$ and $R_a$ are the length of the semimajor and semiminor axes, respectively.

One embodiment includes, in 261, applying thresholds on both the ellipse fitting error and to the lengths of the semimajor and semiminor axes to determine if a head is detected. These thresholds are determined empirically.

Figure 8:
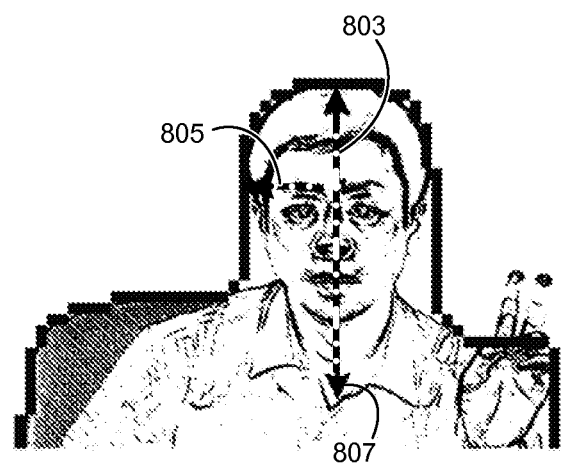
FIG. 8 shows a detected head using an embodiment of the invention on the same example picture as used in FIG. 7.

FIG. 8 shows a detected head using an embodiment of the invention on the same example picture as used in FIG. 7, wherein the broken lines 803, 805 with arrows indicate the semimajor and semiminor axes.

One embodiment further includes determining the head height. One version includes determining the head height without locating facial features such as one or more of the eyes and the mouth, while another version includes determining the eyes and the mouth.

One head height determining method that works reasonably well when the clothes below the head are in a non-skin color includes locating/finding the lowest edge feature on the vertical direction of the found origin. In the example of FIG. 8, this bottom is shown as the bottom point arrow 807.

In another embodiment, a constant height is assumed in proportion to a measure of the width of the head contour.

Some embodiments of the invention include attempting to detect one or more of: one or both eyes, and the mouth. Locating the positions of the eyes and mouth improves determining of the height of the detected head. Such locating may have other applications useful in the coding of the picture.

Horizontal Edge Detection

The inventors noted that in the face region of many pictures, the eyes, mouth, and sometimes nose often have significant variation of luminance in the vertical direction. One embodiment that includes facial feature detection includes horizontal edge detection using the vertical gradients of the head region, and applying a threshold, e.g., higher than for the edge detection step to suppress insignificant gradient variation.

Figure 9A:
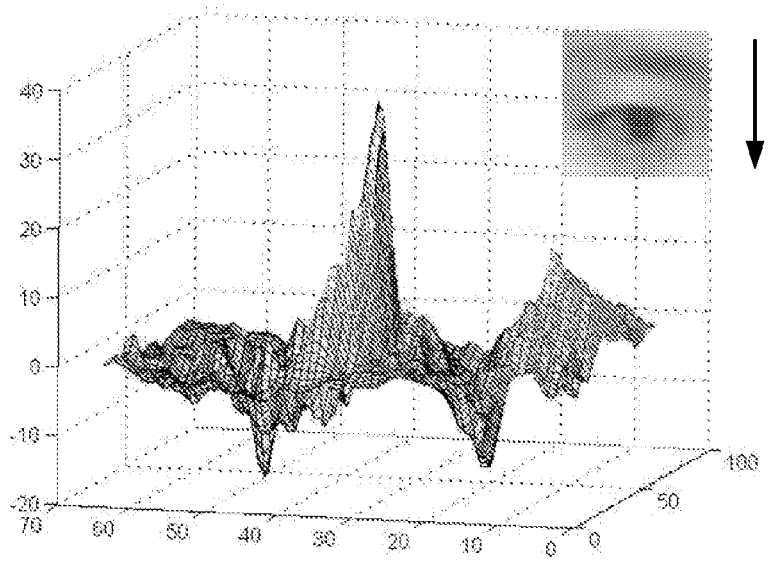
FIGS. 9A, 9B, and 9C provides an illustration of using horizontal edge detection to detect face features such as the eyes and mouth according to an embodiment of the invention.
Figure 9B:
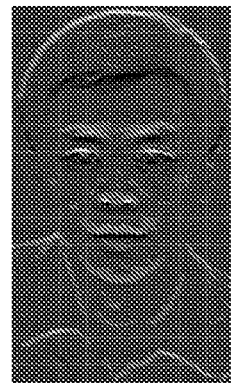
Figure 9C:
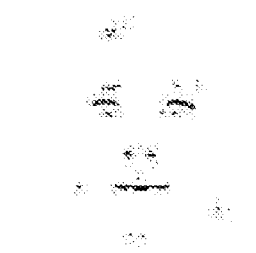

FIGS. 9A, 9B, and 9C provide an illustration of the rationale for using horizontal edge detection. FIG. 9A shows a two-dimensional plot of the vertical gradients of an example eye. The example eye is shown on top left of FIG. 8A. Note that the gradient changes between significant positive to significant negative frequently. FIG. 9B shows the vertical gradients, denoted $G_y$, of an entire head region of a sample picture, FIG. 9C shows/presents the Sobel horizontal edge-detection results after thresholding of $G_y$. It can be seen that most of the remaining horizontal edge features are in the eyes, mouth, and nose regions.

Thus one example includes determining horizontal edges. In one embodiment, the method uses the vertical gradients and applies thresholding. Those in the art will appreciate that many alternate edge detection methods are known, and different alternate horizontal edge detection methods may be used in alternate embodiments of the invention. How to so incorporate alternate methods would be clear to those in the art.

Eyes & Mouth Search

One embodiment that includes detecting one or more face features includes in 265 searching for the features, e.g., eyes and mouth in the horizontal edge results. One embodiment of 265 includes performing a progressive scan in the head region to identify the clustered edge features and record their center positions. Clusters with few edge features are discarded. The selected clusters are sorted first in the ascending order of their vertical positions and then in the ascending order of their horizontal positions. Then, for each of the clusters, sequentially, the method includes noting the cluster as an eye candidate, and hypothetically searching for another eye candidate that is within a proper distance to the present eye candidate. If such a pair of eye candidates is detected, their middle point is taken as the horizontal position of the mouth, and a further search is performed along the vertical direction to find clusters that are within proper distances, to detect the mouth, or if more than one region is detected, the mouth and the nose. A non-skin color test is performed on the found eyes and mouth to validate the result and reduce false alarms.

Figure 10:
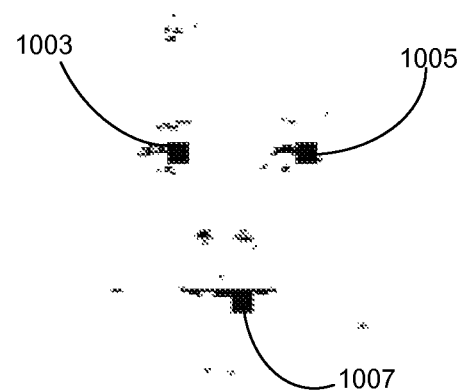
FIG. 10 shows the results of applying eyes and face detection to the example horizontal gradients shown in FIG. 9C.

FIG. 10 shows an example picture after such an eye and mouth detection method is performed using the example picture horizontal edge data shown in FIG. 9C. The detected eyes and mouth are marked as 1003, 1005, and 1007.

FIG. 11A, 11B, 11C, and 11D show/present several test results using an embodiment of the face detection method on different test pictures. The eyes and mouth, if detected, are also marked on the pictures.

Figure 11A:
FIGS. 11A, 11B, 11C, and 11D show the results of applying an embodiment of the present invention to different example pictures.
Figure 11B:
Figure 11C:
Figure 11D:

FIGS. 11A-11C have a mostly clean background with the color falling into the ranges of the skin tone, while FIG. 11D has a relatively complex background.

The detected face information is relayed to the coding processors. In one embodiment, the face information is used to determine the quantization parameter denoted QP that is used to quantize the transform coefficients of one or more blocks of image data in each macroblock. When using video coding that is H.264 compliant, there may be blocks that are as small as 4 by 4 within each macroblock.

In one embodiment, the quantization is defined by a quantization parameter, denoted QP, the high QP value denoting coarser quantization. In many coding methods, the quantization parameter is controlled by a rate control method.

In one embodiment of the invention, the coder tends to assign MBs in a face region to be quantized with a smaller value for the QP, i.e., with finer quantization. In one embodiment, once a face region is defined, all MBs in the face region are allocated a single different "face region" QP that is lower than non-face region MBs. In another embodiment, MBs in the center of the face region are allocated the lowest QP while those MBs close to the boundary of the face region are assigned a QP value that is slightly higher.

One embodiment includes time smoothing to smooth out sudden jumps in the face detection method. In on embodiment, the time smoothing is applied to the method of allocating the QP value according to whether or not a MB is in a face region.

In one embodiment, a delta_QP is specified; for example, the QP in a face region is 8 steps lower than the QP in the rest of the picture, i.e., delta_QP=−8. In one embodiment that includes time smoothing, the coding processor for the MB maintains a current-delta-QP value, between 0 and −8. When the MB is outside a face region, current-delta-QP value moves in time towards 0. Within the face region, the current-delta-QP value ramps toward 8. In one embodiment, the total ramp time is one second. Different ramp times, and different ways of ramping can be used in different embodiments.

In an alternate embodiment, the time smoothing is applied within the face detecting block-level processing 250 to apply to smoothing over time to the defined region from frame to frame.

In one embodiment, a computer-readable medium is encoded with instructions that when executed by one or more processors of a face detector, e.g., a face detector in a video coding apparatus, cause the one or more processors to carry out a method of face detecting as described herein.

It should be appreciated that although the invention has been described in the context of the H.264 standard and in the context of a video teleconferencing system, the invention is not limited to such contexts and may be utilized in various other applications and systems, for example for other video resolutions and for use in other video processing systems. Furthermore, while the invention has been described in terms of MBs of 16 by 16 pixels, that invention is usable for other block sizes.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that has encoded thereon logic, e.g., software, including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable medium on which is encoded logic, e.g., in the form of instructions.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that has encoded thereon the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium having encoded thereon a set of instructions, e.g., a computer program that are for execution on one or more processors, e.g., one or more processors that are part of a video coding system. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium has encoded thereon logic including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of medium (e.g., a computer program product on a computer-readable storage medium) having encoded thereon computer-readable program code embodied in the medium.

The software may further be transmitted or received over a network via a network interface device. While the medium is shown in an example embodiment to be a single medium, the term "medium" should be taken to include a single medium or multiple media (e.g., a centralized or distributed database, and/or associated caches and servers) that store the one or more sets of instructions. The term "medium" shall also be taken to include any medium that is capable of storing, e.g., having encoded thereon a set of instructions for execution by one or more of the processors and that cause the one or more processors to perform any one or more of the methodologies of the present invention. A medium may take many forms, including but not limited to anon-volatile medium, or volatile medium. Non-volatile media includes, for example, optical, magnetic disks, and magneto-optical disks. Volatile media includes dynamic memory, such as main memory. For example, the term "medium" shall accordingly be taken to include, but not be limited to, solid-state memories, a computer product embodied in optical and magnetic media.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. An apparatus comprising:
    a plurality of interconnected processors operative to perform coding functions for coding respective parts of a picture of a video stream in parallel, wherein each respective part includes a plurality of blocks of the picture, the interconnected processors further operative to determine in parallel, for each of at least some of the blocks in each processor's respective part, any block-level edge features including an indication of the number of block-level edge features, block-level color-segmented edge features including an indication of the number of block-level color-segmented edge features, wherein the determining of block-level edge features includes detecting edges and the determining of block-level color-segmented edge features includes color segmentation; and
    block-level processing logic operative to receive the indications of the numbers of block-level edge features and block-level color-segmented edge features in the blocks and to carry out processing to determine, using the received indications, which blocks in the picture are likely to be that of a face.

2. An apparatus as recited in claim 1, further comprising:
    a video divider operative to accept at least a portion of a picture of the video stream and to divide the at least portion of the picture into the parts for the plurality of processors,
    wherein each processor is coupled to the video divider and includes a coding processor operative to code the respective part of the picture, such that the plurality of processors can operate in parallel to simultaneously perform coding functions on a plurality of parts, and
    wherein the processing by the block-level processing logic is at a granularity of at least a block.

3. An apparatus as recited in claim 2, wherein the video stream has a video rate at which video pictures are refreshed, and wherein the apparatus is configured to code the video stream and to determine which blocks in each picture of the video stream are likely to be that of a face at the video rate of the video stream.

4. An apparatus as recited in claim 2, wherein the coding by each of the coding processors includes quantization, and wherein the plurality of coding processors are operative to use the results of the determining of which blocks in the picture are likely to be that of a face to more finely quantize blocks that are likely to be that of a face than blocks that are less likely to be that of a face.

5. An apparatus as recited in claim 2, wherein the block-level processing logic includes a block-level processor coupled to the plurality of processors.

6. An apparatus as recited in claim 2, wherein block-level processing logic is operative to carry out block-level processing simultaneously with one or more video coding tasks carried out in parallel by the plurality of coding processors.

7. An apparatus as recited in claim 2, wherein the processing by the block-level processing logic is carried out by one or more of the plurality of processors.

8. An apparatus as recited in claim 2, wherein a plurality of the processors is included in a multi-core processing apparatus.

9. An apparatus as recited in claim 2, wherein the video stream is a high definition video stream with each frame having at least 700 lines of video.

10. An apparatus as recited in claim 2, wherein each part includes one or more rows of blocks of a frame.

11. An apparatus as recited in claim 2, wherein the block-level processor is further operative to detect face features, and to generate an indication of which blocks include eyes and/or a mouth if at least one eye and/or a mouth is/are detected.

12. A method comprising:
    dividing at least a portion of a picture of a video stream into parts, each part including a plurality of blocks of the picture;
    processing the parts in parallel by a plurality of interconnected processors, each part being processed by a respective processor, the processing of a respective part by its respective processor including:
        edge detection and color segmentation to determine: block-level edge features including an indication of the number of block-level edge features; and block-level color-segmented edge features including an indication of the number of color-segmented block-level edge features, and
        performing coding functions; and
    block-level processing using the indications of the numbers of block-level edge features and block-level color-segmented edge features to determine which blocks in the picture are likely to be that of a face, the block-level processing being at a granularity of at least a block.

13. A method as recited in claim 12,
    wherein the coding by each of the processors includes quantization, and wherein the processors use the results of the determining of which blocks in the picture are likely to be that of a face to more finely quantize blocks that are likely to be that of a face than blocks that are less likely to be that of a face.

14. A method as recited in claim 13, wherein the coding produces a coded bitstream for the video stream, and wherein the method further includes incorporating information in the coded bitstream to enable a decoder to know the quantization used in the bitstream.

15. A method as recited in claim 12, further comprising pre-processing the picture, the pre-processing including one or both of color space conversion and selecting which macroblock lines are to be subject to the edge detection, color segmentation, and block-level processing.

16. A method as recited in claim 12, wherein the block-level processing is carried out simultaneously with the processors' carrying out coding tasks.

17. A method as recited in claim 12, wherein the processing of the respective part by each processor further includes thinning the results of edge detection such that the block-level color-segmented edge features include block-level thinned color-segmented edge features.

18. A method as recited in claim 12, wherein the block-level processing includes head detecting using the block-level color-segmented features to detect one or more candidate regions, and repeating for each candidate region the steps of locating a pre-defined part of a head, determining one or more boundary points that define a contour, and fitting a pre-defined shape to the contour, in order to carry out head region detection.

19. A method as recited in claim 18, wherein the block-level processing further includes horizontal edge detection and face feature searching to carry out eye and mouth detection within a detected head region.

20. A non-transitory computer-readable and tangible medium on which are encoded instructions that when executed by one or more processors carry out a method, the method comprising:
dividing at least a portion of a picture of a video stream into parts, each part including a plurality of blocks of the picture;
processing the parts in parallel by a plurality of interconnected processors, each part being processing by a respective coding processor, the processing of a respective part by its respective coding processor including:
edge detection and color segmentation to determine: block-level edge features including an indication of the number of block-level edge features; and block-level color-segmented edge features including an indication of the number of color-segmented block-level edge features, and
performing coding functions; and
block-level processing using the indications of the numbers of block-level edge features and block-level color-segmented edge features to determine which blocks in the picture are likely to be that of a face, the block-level processing being at a granularity of at least a block.

21. A non-transitory computer-readable and tangible medium as recited in claim 20, wherein the coding by each of the coding processors includes quantization, and wherein the coding processors use the results of the determining of which blocks in the picture are likely to be that of a face to more finely quantize blocks that are likely to be that of a face than blocks that are less likely to be that of a face.

* * * * *